US012692417B2

(12) United States Patent
Zhang et al.

(10) Patent No.: US 12,692,417 B2
(45) Date of Patent: Jul. 28, 2026

(54) ADHESIVE TAPE

(71) Applicant: 3M INNOVATIVE PROPERTIES COMPANY, St. Paul, MN (US)

(72) Inventors: Yunshu Zhang, Shanghai (CN); Yi Lei Zhu, Shanghai (CN); Chao Yang, Shanghai (CN); Xue-hua Chen, Shanghai (CN); Lei Dong, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 337 days.

(21) Appl. No.: 18/282,708

(22) PCT Filed: Mar. 29, 2022

(86) PCT No.: PCT/IB2022/052860
§ 371 (c)(1),
(2) Date: Sep. 18, 2023

(87) PCT Pub. No.: WO2022/208325
PCT Pub. Date: Oct. 6, 2022

(65) Prior Publication Data
US 2024/0174896 A1      May 30, 2024

(30) Foreign Application Priority Data
Mar. 29, 2021    (CN) ......................... 202110337147.X

(51) Int. Cl.
*C09J 7/25*      (2018.01)
*C09J 7/38*      (2018.01)

(52) U.S. Cl.
CPC . *C09J 7/25* (2018.01); *C09J 7/38* (2018.01); *C09J 2203/326* (2013.01); *C09J 2301/302* (2020.08); *C09J 2433/00* (2013.01); *C09J 2475/00* (2013.01); *C09J 2479/086* (2013.01); *Y10T 428/28* (2015.01); *Y10T 428/2843* (2015.01); *Y10T 428/2852* (2015.01)

(58) Field of Classification Search
None
See application file for complete search history.

(56) References Cited

U.S. PATENT DOCUMENTS

| | | | | |
|---|---|---|---|---|
| 4,687,615 | A | * | 8/1987 | Kondo ................. B29C 48/885 264/289.3 |
| 5,247,051 | A | * | 9/1993 | Lucke .................... C09J 171/00 528/125 |
| 6,445,067 | B1 | | 9/2002 | Corisis et al. |
| 6,700,185 | B1 | | 3/2004 | Kawai et al. |
| 7,843,045 | B2 | | 11/2010 | Tateoka et al. |
| 2003/0190466 | A1 | | 10/2003 | Nakaba et al. |
| 2004/0124544 | A1 | | 7/2004 | Kawai |
| 2009/0110845 | A1 | * | 4/2009 | Lu ....................... G01N 29/2475 427/560 |
| 2011/0056623 | A1 | | 3/2011 | Im et al. |
| 2015/0125692 | A1 | | 5/2015 | Müssig et al. |
| 2016/0052246 | A1 | | 2/2016 | Egger et al. |
| 2017/0204233 | A1 | * | 7/2017 | Nakanishi ............... C08L 71/10 |
| 2018/0016473 | A1 | * | 1/2018 | Takayanagi ................ C09J 5/06 |
| 2021/0061998 | A1 | * | 3/2021 | Asanuma ................ C08L 71/08 |

FOREIGN PATENT DOCUMENTS

| | | | | |
|---|---|---|---|---|
| CN | 113861919 | A | 12/2021 | |
| EP | 0361975 | A2 * | 4/1990 | ............ C09J 121/02 |
| JP | 2012201846 | A | 10/2012 | |
| WO | 2014-080918 | | 5/2014 | |
| WO | 2020100434 | A1 | 5/2020 | |
| WO | 2022003602 | A1 | 1/2022 | |

OTHER PUBLICATIONS

"TA Instruments Thermomechanical Analyzer Q400", Mar. 23, 2026 (Year: 2026).*
Victrex:DataSheetofAptivFilms2000—Nov. 30, 2023—pp. 1-2.
International Search report for PCT International Application No. PCT/IB2022/052860, mailed on Jun. 27, 2022, 3 pages.

* cited by examiner

*Primary Examiner* — Anish P Desai
(74) *Attorney, Agent, or Firm* — Jeffrey M. Olofson

(57)          ABSTRACT
Provided in the present invention is an adhesive tape, including: a base film, having a coefficient of thermal expansion within a range of 4.5 to 15 ppm/° C.; and an adhesive layer, including polyether ether ketone having a crystallinity equal to or less than 10% and an elastic modulus between 10 and 100 MPa at 150-300° C. The adhesive tape according to the technical solution of the present invention can effectively avoid problems such as chip tilt, packaging material flash, contamination caused by an adhesive residue, lead frame warpage, and the like during back-end packaging of a semiconductor device.

14 Claims, 1 Drawing Sheet

ADHESIVE TAPE

TECHNICAL FIELD

The present invention relates to the technical field of packaging of semiconductor devices. Particularly, the present invention provides an adhesion tape, more particularly, an adhesion tape especially applicable to back-end packaging of a semiconductor device.

BACKGROUND

In the past, the following process is generally used to package a semiconductor device: firstly, a semiconductor element is adhered to a die pad by means of an adhesion agent such as a silver paste; then the same is connected to a lead frame by means of a lead; and then portions other than a rear lead for external wiring are all packaged by means of a packaging material (for example, an epoxy resin).

In recent years, in order to enable a packaged semiconductor device to have a reduced size, weight, and thickness, a quad flat no-lead package (QFN) process has been gradually developed. FIG. 1 shows general procedures of a conventional QFN process. Specifically, in step 1, an adhesive tape is adhered to a surface of a lead frame. In step 2, a chip is attached to a chip pad on a side of the lead frame by means of a chip attaching material (for example, a silver paste). In step 3 (a wire bonding procedure), a lead (for example, a gold lead or a copper lead) is used to connect the chip to the lead frame at a high temperature (for example, 180 to 240° C.) so as to acquire an assembly. In step 4, plasma treatment is performed on the connected assembly to clean the surface of the lead frame and enhance adhesion strength between the assembly and a packaging resin applied subsequently. In step 5, the assembly is packaged on a chip assembly side of the assembly by means of a packaging material (for example, an epoxy resin), and curing is performed. In step 6, the adhesive tape is peeled off from the assembly. In step 7, the assembly from which the adhesive tape has been removed is divided to acquire separate packaged semiconductor devices. Specific properties of the adhesive tape used in the QFN process are critical to the QFN process.

Therefore, it is of great significance to develop a novel adhesion tape for back-end packaging of a semiconductor device.

SUMMARY

On the basis of the aforementioned technical problem, the objective of the present invention is to provide an adhesive tape. The adhesion tape can effectively avoid problems such as chip tilt, packaging material flash, contamination caused by an adhesive residue, lead frame warpage, and the like during packaging of a semiconductor device.

The inventors have conducted intensive and detailed research to achieve the present invention.

According to an aspect of the present invention, an adhesive tape is provided, and comprises:

a base film, having a coefficient of thermal expansion within a range of 4.5 to 15 ppm/° C.; and an adhesive layer, comprising polyether ether ketone having a crystallinity equal to or less than 10% and an elastic modulus between 10 and 100 MPa at 150-300° C.

According to some preferred embodiments of the present invention, the base film is a heat-resistant base film.

According to some preferred embodiments of the present invention, the base film is a polyimide film.

According to some preferred embodiments of the present invention, a glass transition temperature of the polyimide film is greater than or equal to 300° C.

According to some preferred embodiments of the present invention, the base film has a thickness within a range of 5 to 50 μm.

According to some preferred embodiments of the present invention, the base film and the adhesive layer are bonded to each other.

According to some preferred embodiments of the present invention, the adhesive layer does not comprise any epoxy resin reactive group.

According to some preferred embodiments of the present invention, the adhesive layer does not comprise any carboxyl group, acid anhydride group, amine group, amide group, carbamate group, isocyanate group, epoxy group, hydroxyl group, or thiol group.

According to some preferred embodiments of the present invention, the adhesive layer has a thickness within a range of 6 to 50 μm.

According to some preferred embodiments of the present invention, the adhesive tape further comprises an adhesion agent layer located between the base film and the adhesive layer.

According to some preferred embodiments of the present invention, the adhesive tape sequentially comprises the base film, the adhesion agent layer, and the adhesive layer contacting each other.

According to some preferred embodiments of the present invention, the adhesion agent layer comprises a pressure-sensitive adhesion agent or a semi-structural adhesion agent.

According to some preferred embodiments of the present invention, the adhesion agent layer comprises one or more of an acrylate-based adhesion agent or a polyurethane-based adhesion agent.

According to some preferred embodiments of the present invention, the adhesion agent layer has a thickness within a range of 2 to 8 μm.

Compared with the existing techniques in the art, the present invention has the following advantages: the adhesive tape according to the present invention can effectively avoid problems such as chip tilt, packaging material flash, contamination caused by an adhesive residue, lead frame warpage, and the like during packaging such as back-end packaging of a semiconductor device.

DETAILED DESCRIPTION

Figure 1:
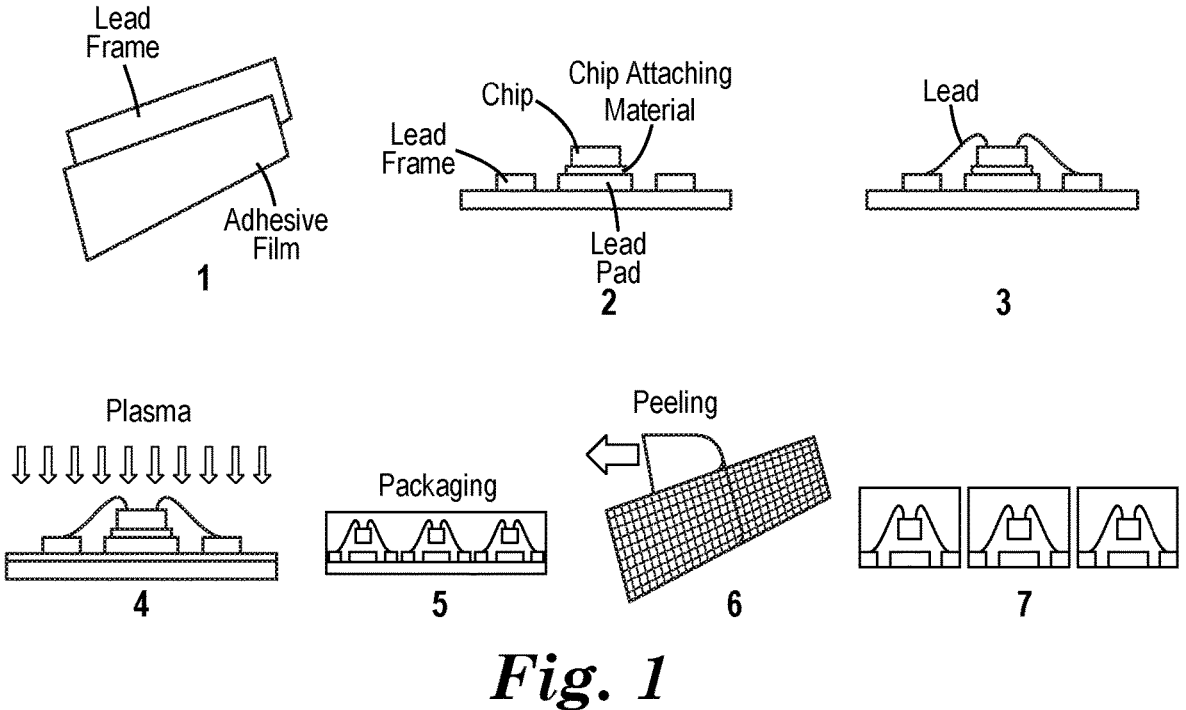
FIG. 1 shows general procedures of a conventional QFN process.

It is to be understood that a person skilled in the art can envisage other various embodiments according to teachings in this description, and can make modifications thereto without departing from the scope or spirit of the present disclosure. Therefore, the following embodiments are not restrictive in meaning.

All figures for denoting characteristic dimensions, quantities and physicochemical properties used in this description and claims are to be understood as modified by a term "about" in all situations, unless indicated otherwise. Therefore, unless stated conversely, parameters in numerical values listed in the above description and the claims are all approximate values, and a person skilled in the art is capable of seeking to obtain desired properties by taking advantage of contents of the teachings disclosed herein, and changing these approximate values appropriately. The use of a numerical range represented by end points includes all figures within the range and any range within the range, for example, 1 to 5 includes 1, 1.1, 1.3, 1.5, 2, 2.75, 3, 3.80, 4, 5, etc.

In recent years, in order to enable a packaged semiconductor device to have a reduced size, weight, and thickness, a quad flat no-lead package (QFN) process has been gradually developed. A lead frame of a package having such a structure does not protrude from a packaging resin, so that the semiconductor device can have a reduced size, weight, and thickness. However, the inventors of the present application have found that one or more of the following problems often occur during actual operation of QFN: displacement of a chip, namely "chip tilt," may occur in step 3 (a wire bonding procedure). Packaging material flash may occur in packaging step 5, that is, a packaging material (for example, an epoxy resin) flows into a gap between a lead frame and an adhesive tape. In peeling step 6, it is found that adhesive residues of the adhesive tape remain on the separated lead frame and on the cured packaging material (for example, an epoxy resin), and it is difficult to remove the adhesive residues. The lead frame sometimes warps, resulting in that subsequent processes cannot be performed.

The inventors of the present application have found that the above problems are all related to performance of the adhesive tape used in the QFN process. Therefore, an objective of the present invention is to provide an adhesive tape. The adhesive tape can effectively avoid problems such as chip tilt, packaging material flash, contamination caused by an adhesive residue, lead frame warpage, and the like during packaging of a semiconductor device.

Specifically, according to an aspect of the present invention, an adhesive tape is provided, and includes:

a base film, having a coefficient of thermal expansion within a range of 4.5 to 15 ppm/° C.; and an adhesive layer, including polyether ether ketone having a crystallinity equal to or less than 10% and an elastic modulus between 10 and 100 MPa at 150-300° C.

According to a preferred technical solution of the present invention, the adhesive tape includes a base film and an adhesive layer. The adhesion layer is adhered to the lead frame in the QFN process, and the base film is used to provide necessary support for the adhesive tape. The base film is preferably a heat-resistant base film to withstand a high temperature (for example, 180 to 240° C.) that needs to be applied during the wire bonding procedure. Preferably, the base film is a polyimide film. Polyimide is an excellent high temperature resistant organic high polymer material, and can withstand high temperatures greater than or equal to 400° C. More preferably, a glass transition temperature of the polyimide film is greater than or equal to 300° C. In addition, a coefficient of thermal expansion of the base film needs to be within a range of 4.5 to 15 ppm/° C.

The inventors of the present application have found that lead frame warpage occurring in actual operation of QFN is related to a material of which the base film is made. When the coefficient of thermal expansion of the base film is greater than 15 ppm/° C., the base film deforms obviously during high-temperature treatment of the QFN process, resulting in warpage of the lead frame. This is very unfavorable for a subsequent machining process. When the coefficient of thermal expansion of the base film is less than 4.5 ppm/° C., it is possible that adhesion between the base film and the adhesive layer adhered thereto fails during the high-temperature treatment of the QFN process, and therefore the base film and the adhesive layer separate from each other.

In order to provide effective support for the adhesive tape, preferably, the base film has a thickness within a range of 5 to 50 μm, preferably 10 to 40 μm, and more preferably 15 to 25 μm.

Commercially available examples of the base film that can be used in the present invention include: polyimide (PI) film GK 100A provided by SKC Company in Republic of Korea, the film having a coefficient of thermal expansion of 4.5 ppm/° C. and a thickness of 25 μm; and polyimide (PI) film GF100 provided by SKC Company in Republic of Korea, the film having a coefficient of thermal expansion of 15 ppm/° C. and a thickness of 25 μm.

The adhesive layer according to the technical solution of the present invention is adhered to the lead frame in the QFN process. The adhesive layer includes polyether ether ketone having a crystallinity equal to or less than 10% and an elastic modulus between 10 and 100 MPa at 150-300° C. The inventors of the present application have found that problems such as chip tilt, packaging material flash, contamination caused by an adhesive residue, and the like occurring in the QFN process are closely related to material selection for the adhesive layer. When the crystallinity of the polyether ether ketone used is greater than 10%, adhesion force of the polyether ether ketone at high temperatures is greatly reduced, and no effective adhesion to the lead frame can be achieved. In addition, when the elastic modulus of polyether ether ketone at 150-300° C. is greater than 100 MPa, the adhesion force of polyether ether ketone at high temperatures is greatly reduced, and no effective adhesion to the lead frame can be achieved. When the elastic modulus of the polyether ether ketone at 150-300° C. is less than 10 MPa, the adhesive force between polyether ether ketone and the lead frame is overly large, and the adhesive tape cannot be peeled off from the assembly in step 6.

In order to achieve effective adhesion to the lead frame, preferably, the adhesive layer has a thickness within a range of 6 to 50 μm, preferably 8 to 25 μm, and more preferably 9 to 12 μm.

Preferably, the adhesive layer does not include any epoxy resin reactive group. According to the disclosure of the present application, the term "epoxy resin reactive group" refers to a group reactive with groups present in an epoxy resin. The inventors of the present application have found that when the adhesive layer includes a group (for example, carboxyl group, acid anhydride group, amine group, amide group, carbamate group, isocyanate group, epoxy group, hydroxyl group, or thiol group) reactive with an epoxy resin, in the high-temperature treatment process of the QFN process, the group (for example, carboxyl group, acid anhydride group, amine group, amide group, carbamate group, isocyanate group, epoxy group, hydroxyl group, or thiol group) in the adhesive layer reactive with an epoxy resin reacts with an epoxy group in a commonly used packaging material (for example, an epoxy resin) or a curing agent and an accelerator thereof, resulting in that serious residues of the adhesive tape are present on the lead frame and the cured packaging material (for example, an epoxy resin) in peeling step 6. Therefore, preferably, the adhesive layer does not include any group (for example, carboxyl group, acid anhydride group, amine group, amide group, carbamate group, isocyanate group, epoxy group, hydroxyl group, or thiol group) reactive with an epoxy resin.

Commercially available examples of the adhesive layer that can be used in the present invention include: polyether ether ketone film Aptive 2000 provided by Victrex Company, the film having a thickness of 9 µm, a crystallinity of 2%, and an elastic modulus of 10 to 100 MPa at 150-300° C., and not including any group (for example, carboxyl group, acid anhydride group, amine group, amide group, carbamate group, isocyanate group, epoxy group, hydroxyl group, or thiol group) reactive with an epoxy resin.

According to an embodiment of the present invention, the adhesive tape includes a two-layer structure, namely, a base film and an adhesive layer bonded to each other. No particular limitation is set on a method for preparing the adhesive tape having the structure including the base film and the adhesive layer bonded to each other. For example, the base film and the adhesive layer may be bonded to each other by means of hot pressing.

Figure 2:
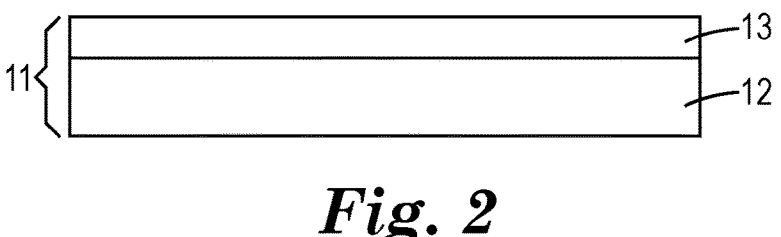
FIG. 2 shows a schematic cross-sectional view of an adhesive tape according to an embodiment of the present invention.

FIG. 2 shows a schematic cross-sectional view of an adhesive tape 11 according to an embodiment of the present invention. As shown in FIG. 2, the adhesive tape 11 includes a base film 12 and an adhesive layer 13 bonded to each other. For specific details of the adhesive tape 11, the base film 12, and the adhesive layer 13, please refer to the above disclosure.

According to another embodiment of the present invention, the adhesive tape further includes an adhesion agent layer located between the base film and the adhesive layer. Preferably, the adhesive tape sequentially includes the base film, the adhesion agent layer, and the adhesive layer contacting each other. The function of the adhesion agent layer is to adhere the base film and the adhesive layer to each other. No particular limitation is set on a specific type of an adhesion agent that can be used to form the adhesion agent layer, and selection can be made from various adhesion agents commonly used in the field of packaging of semiconductor devices. Preferably, the adhesion agent may be a pressure-sensitive adhesion agent or a semi-structural adhesion agent. More preferably, the adhesion agent layer includes one or more of an acrylate-based adhesion agent or a polyurethane-based adhesion agent.

In order to achieve good adhesion to the base film and the adhesive layer, preferably, the adhesion agent layer has a thickness within a range of 2 to 8 µm, preferably 3 to 6 µm, and more preferably 4 to 5 µm.

The adhesion agent can be acquired commercially, or can be prepared by using a synthetic method known in the art. Examples of the pressure-sensitive adhesive that can be used in the present invention include pressure-sensitive adhesive AR-5 produced by 3M Company.

Therefore, according to another embodiment of the present invention, the adhesive tape includes a three-layer structure, namely, a base film, an adhesion agent layer, and an adhesive layer sequentially bonded to each other. No particular limitation is set on a method for preparing the adhesive tape having the structure including the base film, the adhesion agent layer, and the adhesive layer sequentially bonded to each other. For example, the adhesive tape can be prepared by preparing a base film, coating a surface of the base film with an adhesion agent to prepare an adhesion agent layer, and laminating an adhesive layer on the prepared adhesion agent layer.

Figure 3:
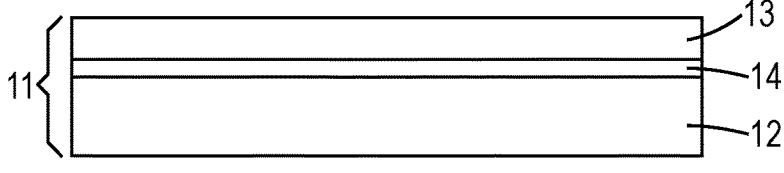
FIG. 3 shows a schematic cross-sectional view of an adhesive tape according to another embodiment of the present invention.

FIG. 3 shows a schematic cross-sectional view of an adhesive tape 11 according to another embodiment of the present invention. As shown in FIG. 3, the adhesive tape 11 includes a base film 12, an adhesion agent layer 14, and an adhesive layer 13 bonded to each other. For specific details of the base film 12, the adhesion agent layer 14, and the adhesive layer 13, please refer to the above disclosure.

The following embodiments intend to explain the present disclosure exemplarily rather than restrictively.

Embodiment 1 is an adhesive tape, the adhesive tape including:
a base film, having a coefficient of thermal expansion within a range of 4.5 to 15 ppm/° C.; and
an adhesive layer, including polyether ether ketone having a crystallinity equal to or less than 10% and an elastic modulus between 10 and 100 MPa at 150-300° C.

Embodiment 2 is the adhesive tape according to embodiment 1, wherein the base film is a heat-resistant base film.

Embodiment 3 is the adhesive tape according to embodiment 1, wherein the base film is a polyimide film.

Embodiment 4 is the adhesive tape according to embodiment 3, wherein a glass transition temperature of the polyimide film is greater than or equal to 300° C.

Embodiment 5 is the adhesive tape according to embodiment 1, wherein the base film has a thickness within a range of 5 to 50 µm.

Embodiment 6 is the adhesive tape according to embodiment 1, wherein the base film and the adhesive layer are bonded to each other.

Embodiment 7 is the adhesive tape according to embodiment 1, wherein the adhesive layer does not include any epoxy resin reactive group.

Embodiment 8 is the adhesive tape according to embodiment 1, wherein the adhesive layer does not include any carboxyl group, acid anhydride group, amine group, amide group, carbamate group, isocyanate group, epoxy group, hydroxyl group, or thiol group.

Embodiment 9 is the adhesive tape according to embodiment 1, wherein the adhesive layer has a thickness within a range of 6 to 50 µm.

Embodiment 10 is the adhesive tape according to embodiment 1, wherein the adhesive tape further includes an adhesion agent layer located between the base film and the adhesive layer.

Embodiment 11 is the adhesive tape according to embodiment 10, wherein the adhesive tape sequentially includes the base film, the adhesion agent layer, and the adhesive layer contacting each other.

Embodiment 12 is the adhesive tape according to embodiment 10, wherein the adhesion agent layer includes a pressure-sensitive adhesion agent or a semi-structural adhesion agent.

Embodiment 13 is the adhesive tape according to embodiment 10, wherein the adhesion agent layer includes one or more of an acrylate-based adhesion agent or a polyurethane-based adhesion agent.

Embodiment 14 is the adhesive tape according to embodiment 10, wherein the adhesion agent layer has a thickness within a range of 2 to 8 µm.

The present invention will be described below in more details in combination with embodiments. It needs to be pointed out that these descriptions and embodiments are all intended to make the invention easy to understand, rather than to limit the invention. The protection scope of the present invention is subject to the appended claims.

EXAMPLES

In the present invention, unless otherwise pointed out, the reagents employed are all commercially available products, which are directly used without further purification.

TABLE 1

| List of raw materials | | |
|---|---|---|
| Component | Product Details | Supplier |
| Base film | Polyimide film GK 100A, having a coefficient of thermal expansion of 4.5 ppm/° C. and a thickness of 25 μm | SKC Company in Republic of Korea |
| | Polyimide film GF100, having a coefficient of thermal expansion of 15 ppm/° C. and a thickness of 25 μm | SKC Company in Republic of Korea |
| | Polyimide film JFY 25, having a coefficient of thermal expansion of 35 ppm/° C. and a thickness of 25 μm | Junyou Company in China |
| Adhesion agent layer | Pressure-sensitive adhesive AR-5 Polyurethane adhesion agent PU-B, prepared according to the method recorded in Chinese application CN 202010611843.0 | 3M Company |
| | Pressure-sensitive adhesive CSA7001X, acquired from high temperature process tape 7416Y of 3M Company and including a carboxyl group and an epoxy group | 3M Company |
| Adhesive layer | Polyether ether ketone film Aptive 2000, having a crystallinity of 2%, an elastic modulus of 10-100 MPa at 150-300° C., and a thickness of 9 μm | Victrex Company |
| | Polyether ether ketone film Aptive 1000, having a crystallinity greater than 20%, an elastic modulus of 120-800 MPa at 150-300° C., and a thickness of 8 μm | Victrex Company |
| | Thermoplastic polyester elastomer (TPEE) film, having a melting point of 220° C., a crystallinity of 0%, an elastic modulus of 0.0002-2 MPa at 150-240° C., and a thickness of 12 μm | Dupont Company |

Test Method

Test on Coefficient of Thermal Expansion

An instrument TMA Q400 TA Co. was used to test a coefficient of thermal expansion of the base film to be used, a tension mode being used, initial force being 0.05 N. and a heating rate being 3° C./min.

Test on Crystallinity

A crystallinity of the polyether ether ketone film to be used was tested by using the following method. Specifically, an instrument TA Discovery differential scanning calorimeter was used. 5-20 milligrams of a sample were placed into a special aluminum plate and was pressed, and scanning was performed from room temperature to 400° C., wherein a heating rate was 10° C./min. A method for calculating the crystallinity was subtracting an integral value of a cold crystallization peak from an integral value of a melting peak and dividing a subtraction result by a theoretical enthalpy value 130 J/g corresponding to a crystallinity of 100%.

Test on Elastic Modulus

An elastic modulus of the polyether ether ketone film to be used was tested by means of dynamic thermomechanical analysis (DMA). Specifically, an instrument DMA Q800 TA Co. was used to measure an elastic modulus from room temperature to 300 degrees Celsius, wherein a tension mode was used, a frequency being 10 Hz, and a heating rate being 3° C./min.

Chip Tilt Test

The following method was used to perform chip tilt tests on the adhesive tapes acquired in the following examples and comparative examples. Specifically, at a temperature of 230° C. and at a pressure of 0.6 MPa, the adhesive tape was bonded to a side of a lead frame (ASM model QFN528). A K&S IConn automatic wire bonder was used to wire-bond 1.0 palladium copper leads from an "island" end to a "finger" end of the lead frame at 250° C., wherein the total number thereof was 200. Then, 100 leads were randomly selected for a vertical thrust test. If all thrusts were greater than or equal to 12 g, then it was indicated that the wire bonding was successful. If some leads had a thrust less than 12 g, then it was indicated that the leads were not fixedly bonded and that the same might be disconnected due to large impact force in a subsequent plastic packaging process. The number of leads having a thrust less than 12 g was recorded. If the number was 0, then the test indicated a success. If the number was greater than 0, then the test indicated a failure.

Flash Performance Test

The following method was used to perform flash performance tests on the adhesive tapes acquired in the following examples and comparative examples. Specifically, the adhesive tape was bonded to a side of a copper plate. Then, a tensile machine Instron 5942 was used to measure 180° peeling force between the adhesive tape and the copper plate at room temperature. Subsequently, the sample was baked at 230° C. for 45 minutes. Then, the tensile machine Instron 5942 was used to measure 180° peeling force between the adhesive tape and the copper plate after baking. If the measured peeling force at room temperature and peeling force after baking were both greater than or equal to 0.02 N/mm, then packaging material flash could be effectively avoided.

Adhesive Residue Performance Test

The following method was used to perform adhesive residue performance tests on the adhesive tapes acquired in the following examples and comparative examples. Specifically, the adhesive tape was placed, was caused to face upwards, and was treated by using plasma (Diener plasma surface treatment instrument Tetra120, 300 watt, treatment duration being 600 s). Then, the plasma-treated adhesive tape and an epoxy prepreg (Mitsubishi Gas Chemical BT resin) were bonded to each other at 200° C. and at 0.6 MPa. Subsequently, baking was performed at 180° C. for 1 hour, so that the epoxy prepreg was fully cured. Then, the adhesive tape was manually peeled off from a cured sheet. A microscope was used to observe a side of the cured sheet from which the adhesive tape had been peeled off so as to determine whether an adhesive residue was present on the cured sheet. If no adhesive residue was present, then "none" was indicated, and if a large number of residuals were present, then "many" was indicated.

Warpage Performance Test

The following method was used to perform warpage performance tests on the adhesive tapes acquired in the following examples and comparative examples. Specifically, the tape was flatly bonded to a hollow copper frame of 6 cm×16 cm×200 μm at 230° C. and at 0.6 MPa for 30 seconds, wherein a frame edge had a width of 5 mm. Then, a resulting sample was baked at 230° C. for 45 minutes, and was subsequently cooled to room temperature. A height of a warp on a long side edge of the copper frame was measured. If the height of the warp was greater than or equal to 3 mm, then it was indicated that the warp is overly large.

Preparation Example 1

Polyurethane adhesion agent PU-B was prepared according to the method recorded in Chinese application CN 202010611843.0. Specifically, 1.00 g of propylene glycol 1-monomethyl ether 2-acetate (Shanghai Sinopharm Company), 1.58 g of butyl acetate (BA, BASF Company), 0.54 g of methyl isobutyl ketone (MIBK, Shanghai Sinopharm Company), 0.98 g of xylene (Shanghai Sinopharm Company), 1.77 g of XCPA-110 (polyester diol, Asahikawa Chemical Company), 1.61 g of XCPA-195 (polyester diol, Asahikawa Chemical Company), 0.40 g of CAPA-3031 (aliphatic polycaprolactone triol, Perstorp UK Ltd.), 0.15 g of MEK solution including 1 wt % of dibutyltin dilaurate (DBTDL, Shanghai Sinopharm Company), and 0.30 g of acetylacetone were added into a 30 mL plastic bottle. Then, the plastic bottle was capped tightly and placed in a high-speed mixer ARE-310 (commercially available from Thinky Company in Tokyo, Japan). Mixing was performed at 2000 revolutions per minute for two minutes, and then defoaming was performed at 2200 revolutions per minute for two minutes to acquire a homogeneous first solution. Then, 5.22 g of N3800 (hexamethylene diisocyanate trimer, Covestro Company) and 0.24 g of TS-100 (silica particles, Evonik Company) were added into the first solution, and stirring was performed in a high-speed disperser SFJ-400 (commercially available from Shanghai Modern Environmental Engineering Technology Co., Ltd. in Shanghai, China) at 2500 revolutions per minute for five minutes to acquire a homogeneous second solution (namely, a polyurethane adhesion agent solution).

Example 1

At a temperature of 90° C., a side of polyimide film GF100 (having a coefficient of thermal expansion of 15 ppm/° C. and a thickness of 25 μm) was coated with a polyurethane adhesion agent PU-B to form an adhesion agent layer having a thickness of 4 μm. Then, a polyether ether ketone film Aptive 2000 (having a crystallinity of 2%, an elastic modulus of 10-100 MPa at 150-300° C., and a thickness of 9 μm) was adhered to the adhesion agent layer so as to prepare an adhesive tape 1.

Related properties of the prepared adhesive tape 1 were tested by using the chip tilt test method, the flash performance test method, the adhesive residue performance test method, and the warpage performance test method described in detail above. Specific results are shown in Table 2.

Examples 2 and 3 and Comparative Examples 1-4

Adhesive tapes were prepared in a manner similar to that in Example 1, and the difference was that respective specific materials of the base film, the adhesion agent layer, and the adhesive layer were changed as shown in Table 1 provided below so as to acquire adhesive tapes 2 and 3 and comparative adhesive tapes 1-4.

Related properties of the prepared adhesive tapes 2 and 3 and comparative adhesive tapes 1-4 were tested by using the chip tilt test method, the flash performance test method, the adhesive residue performance test method, and the warpage performance test method described in detail above. Specific results are shown in Table 2.

TABLE 2

| | | | | | Flash | | | Number of unqualified |
|---|---|---|---|---|---|---|---|---|
| | Base film | Adhesion agent layer | Adhesive layer | Warp height (mm) | Peeling force at room temperature (N/mm) | Peeling force (N/mm) after baking at 230° C. for 45 minutes | Adhesive residue | leads (thrust <12 g, per 100 leads) |
| Example 1 | Polyimide film GF100 | Polyurethane adhesion agent PU-B | Polyether ether ketone film Aptive 2000 | 0.5-1 | 0.49 | 0.59 | None | 0 |
| Example 2 | Polyimide film GK100A | Polyurethane adhesion agent PU-B | Polyether ether ketone film Aptive 2000 | 0.5-1 | 0.23 | 0.62 | None | 0 |
| Example 3 | Polyimide film GF100 | Pressure-sensitive adhesive AR-5 | Polyether ether ketone film Aptive 2000 | 0-0.5 | 0.18 | 0.083 | None | 0 |
| Comparative example 1 | Polyimide film JFY25 | Polyurethane adhesion agent PU-B | Polyether ether ketone film Aptive 2000 | 4.0-5.0 | 0.32 | 0.17 | None | NA |
| Comparative Example 2 | Polyimide film GF100 | Pressure-sensitive adhesive CSA7001X | None | 0-0.5 | 0.049 | 0.023 | Many | 4 |

Components and performance test of adhesive tapes 1-3 and comparative adhesive tapes 1-4

TABLE 2-continued

Components and performance test of adhesive tapes 1-3 and comparative adhesive tapes 1-4

| | Base film | Adhesion agent layer | Adhesive layer | Warp height (mm) | Flash Peeling force at room temperature (N/mm) | Flash Peeling force (N/mm) after baking at 230° C. for 45 minutes | Adhesive residue | Number of unqualified leads (thrust <12 g, per 100 leads) |
|---|---|---|---|---|---|---|---|---|
| Comparative Example 3 | Polyimide film GF100 | Pressure-sensitive adhesive AR-5 | Polyether ether ketone film Aptive 1000 | NA | 0.001 | | None | NA |
| Comparative Example 4 | Polyimide film GF100 | Pressure-sensitive adhesive AR-5 | TPEE film | NA | Greater than 1 | Cannot be peeled off | NA | NA |

It can be seen from the results shown in Table 2 provided above that the adhesive tape prepared according to the technical solution of the present invention has excellent properties in chip tilt performance, flash performance, adhesive residue performance, and warpage performance.

It can be seen from the results of Comparative Example 1 that an overly large coefficient of thermal expansion of the base film results in overly large warp of the lead frame, and this is very unfavorable to a subsequent machining process.

It can be seen from the results of Comparative Example 2 that using the elastomer pressure-sensitive adhesive CSA7001X having an elastic modulus less than 1 MPa at a high temperature instead of the adhesion agent layer and the adhesive layer results in a high failure rate of wire bonding (chip tilt). In addition, the elastomer pressure-sensitive adhesive CSA7001X includes an epoxy reactive group, thus resulting in serious adhesive residues.

It can be seen from the results of Comparative Example 3 that using the polyether ether ketone film Aptive 1000 having a crystallinity greater than 20% results in that the adhesive layer has overly poor stickiness at a high temperature and therefore cannot be adhered to a substrate.

It can be seen from the results of Comparative Example 4 that when a thermoplastic polyester elastomer (TPEE) film having a structure very similar to that of polyether ether ketone is used, because of a melting point thereof being 220° C., a crystallinity thereof being 0%, and an elastic modulus thereof decreasing sharply at a high temperature, adhesion between the adhesive tape and the substrate is overly high and therefore the adhesive tape and the substrate cannot be separated from each other.

Although embodiments have been shown and described in the present invention, a person skilled in the art will understand that various alternative and/or equivalent embodiments can be used in place of the embodiments shown and described without departing from the scope of the present invention. The present application intends to include any improvement or modification for the specific embodiments discussed in the present invention. Accordingly, the present invention is subjected only to the claims and equivalents thereof.

It should be understood by a person skilled in the art that, various modifications and changes can be made without departing from the scope of the invention. Such modifications and changes are intended to fall within the scope of the invention as defined in the appended claims.

What is claimed is:

1. An adhesive tape, comprising:
a base film, having a coefficient of thermal expansion within a range of 4.5 to 15 ppm/° C.

when tested from of −150° C.-1000° C.; and
an adhesive layer, comprising polyether ether ketone having a crystallinity equal to or less than 10% and an elastic modulus between 10 and 100 MPa at 150-300° C., wherein the adhesive layer is bonded to the base film.

2. The adhesive tape according to claim 1, wherein the base film is a heat-resistant base film.

3. The adhesive tape according to claim 1, wherein the base film is a polyimide film.

4. The adhesive tape according to claim 3, wherein a glass transition temperature of the polyimide film is greater than or equal to 300° C.

5. The adhesive tape according to claim 1, wherein the base film has a thickness within a range of 5 to 50 μm.

6. The adhesive tape according to claim 1, wherein the base film and the adhesive layer are bonded to each other.

7. The adhesive tape according to claim 1, wherein the adhesive layer does not comprise any epoxy resin reactive group.

8. The adhesive tape according to claim 1, wherein the adhesive layer does not comprise any carboxyl group, acid anhydride group, amine group, amide group, carbamate group, isocyanate group, epoxy group, hydroxyl group, or thiol group.

9. The adhesive tape according to claim 1, wherein the adhesive layer has a thickness within a range of 6 to 50 μm.

10. The adhesive tape according to claim 1, wherein the adhesive tape further comprises an adhesion agent layer located between the base film and the adhesive layer.

11. The adhesive tape according to claim 10, wherein the adhesive tape sequentially comprises the base film, the adhesion agent layer, and the adhesive layer contacting each other.

12. The adhesive tape according to claim 10, wherein the adhesion agent layer comprises a pressure-sensitive adhesive adhesion agent or a semi-structural adhesive adhesion agent.

13. The adhesive tape according to claim 10, wherein the adhesion agent layer comprises one or more of an acrylate-based pressure sensitive adhesive adhesion agent or semi-structural adhesive adhesion agent or a polyurethane-based pressure sensitive adhesive adhesion agent or semi-structural adhesive adhesion agent.

14. The adhesive tape according to claim 10, wherein the adhesion agent layer has a thickness within a range of 2 to 8 μm.

*    *    *    *    *